United States Patent [19]

Amaya

[11] 4,260,848
[45] Apr. 7, 1981

[54] READY ACCESS CLOSURE FOR COMMUNICATION CABLES

[75] Inventor: Mauricio Amaya, Roselle, Ill.

[73] Assignee: Reliable Electric Company, Franklin Park, Ill.

[21] Appl. No.: 126,973

[22] Filed: Mar. 3, 1980

[51] Int. Cl.³ .............................................. H02G 7/06
[52] U.S. Cl. ........................................ 174/41; 174/78
[58] Field of Search ....................... 174/41, 59, 60, 78, 174/88 R, 92

[56] References Cited

U.S. PATENT DOCUMENTS

| | | | |
|---|---|---|---|
| 3,153,693 | 10/1964 | Baxter et al. ..................... | 174/41 X |
| 3,654,584 | 4/1972 | Gillemot et al. .................. | 174/78 X |
| 3,701,835 | 10/1972 | Eisele et al. ............................ | 174/41 |
| 3,778,749 | 12/1973 | Kapell ................................ | 174/78 X |
| 3,875,325 | 4/1975 | Anderson et al. ..................... | 174/92 |

Primary Examiner—Laramie E. Askin
Attorney, Agent, or Firm—Trexler, Wolters, Bushnell & Fosse, Ltd.

[57] ABSTRACT

A ready access closure is provided for communication cables of the type having an outer dielectric sheath and an electrically conductive shield surrounded thereby. The closure further includes a frame structure having end brackets, a longitudinal strap and a longitudinal tie brace, the strap and brace joining the brackets. A ground clamp grips the cable shield and is connected directly to the tie brace to form an electrical connection therewith.

5 Claims, 3 Drawing Figures

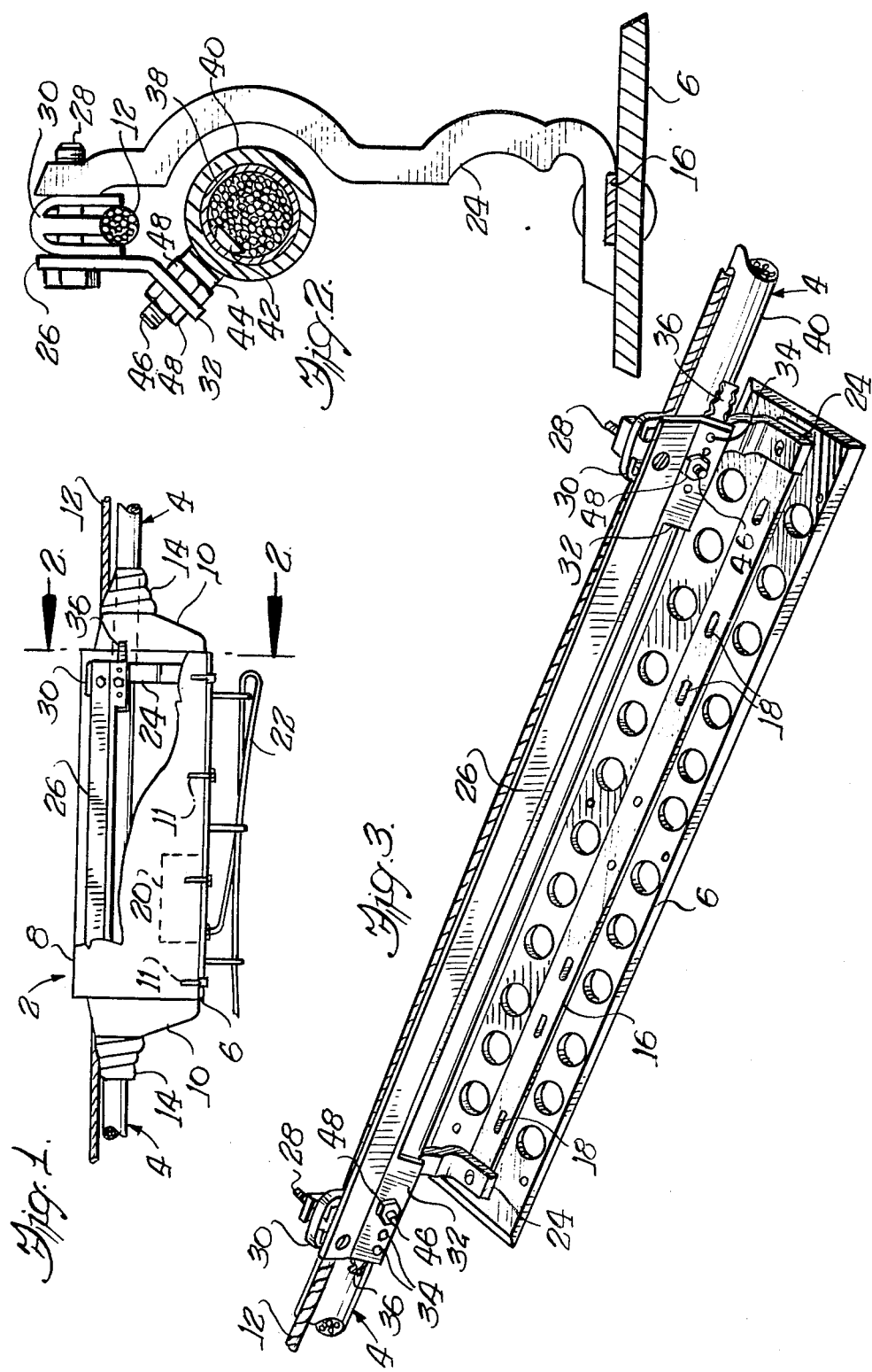

READY ACCESS CLOSURE FOR COMMUNICATION CABLES

BACKGROUND OF THE INVENTION

This invention relates to improvement in splice case closures of the ready access type, particularly those used for communication cables having a number of insulated conductor pairs that are surrounded by a conductive grounding shield which is, in turn, surrounded by a dielectric insulating sheath. Splice case closures of the foregoing type are utilized for telephone service drops between the cable and the subscriber's equipment. The cable has its insulating sheath and its grounding shield severed over a portion within the splice case so that access to the various cable pairs for branchout purposes is facilitated.

The electrical continuity of the grounding shield is maintained by various means including that shown in Gillmot et al U.S. Pat. No. 3,654,584. In that patent a threaded stud is insertable through a punchout opening in the cable shield, and the stud is connected to an adapter member, which is, in turn, connected to a metallic frame. Attached to the stud are clamping elements that grip the cable shield. A ground connection to the cable shield is made at each end of the closure so the electrical continuity between the ends of the cable shield in the closure is maintained through the frame.

OBJECTS AND SUMMARY OF THE INVENTION

An object of this invention is to provide a ready access closure of the general type stated which simplifies the grounding continuity of the cable within the closure. More particularly, the grounding clamps at the ends of the cable are connected directly to a metal tie brace which forms part of the metallic frame within the closure, thereby eliminating the necessity of an adapter shown in U.S. Pat. No. 3,654,584.

In accordance with the foregoing objects there is provided a ready access closure for communications cable wherein the cable has an outer dielectric sheath and an electrically conductive shield surrounded thereby and wherein the shield is interrupted between the hereinafter recited brackets, said closure further having a strap running the length of the closure, spaced apart brackets attached to the respective opposite ends of the strap, a messenger cable running lengthwise of the closure in spaced relation to said strap, a messenger cable clamp secured to each bracket for gripping the messenger cable, a grounding clamp adjacent to each bracket for removably gripping said shield, a unitary electrically conductive tie brace extending between said brackets and joined to each such that a frame structure is provided that includes with said tie brace said brackets and said strap, and fastener means for removably connecting each said grounding clamp directly to said tie brace to form a continuous electrical connection over the interrupted portion of the shield.

BRIEF DESCRIPTION OF THE FIGURES

FIG. 1 is a side elevational view, partially broken away, of a ready access closure embodying the present invention;

FIG. 2 is a sectional view taken along line 2—2 of FIG. 1, and on an enlarged scale and with the closure case cover and other parts removed for purposes of clarity; and FIG. 3 is a fragmentary perspective view of the closure with parts removed for purposes of clarity.

DETAILED DESCRIPTION

Referring now in more detail to the drawing there is shown a ready access closure or splice case 2 for splicing a cable 4 so as to provide service drops to telephone communications subscribers. The splice case 2 comprises an elongated housing having a base 6 and a U-shaped cover 8. At the opposite ends of the cover and base assembly the splice case 2 is provided with boots 10, 10 through which the cable 4 and a messenger cable 12 project. The messenger cable 12 extends continuously through the splice case 2. Tape wrapping 14 substantially seals the joint between the cable and the boot 10. The cover 8 and the base 6 are of dielectric material and mate with each other and are held by clips 11 in a manner known in the art.

Mounted on the base 6 and extending lengthwise therealong is a metallic strap 16 having a series of holes 18 for receiving one or more terminal blocks 20. In a conventional manner the terminal blocks 20 receive branched out pairs of wires from the cable for termination on the terminal block. Also connected to the terminal blocks are service drops, one of which is shown at 22. Each service drop is a pair of insulated electrical conductors which are in electrical connection, respectively, with a pair of wires that are branched out from the cable and terminate at the block 20.

Rigidly attached to the opposite ends of the strap 16 are end brackets 24, 24 which project upwardly from the base end strap 16 at approximately right angles thereto. Extending between the upper ends of the brackets 24, 24 is a tie brace 26, also fabricated of metal. Bolts 28, 28 secure the ends of the tie brace 26 to the respective brackets 24, 24. There is thus provided a rectangular frame structure that comprises the brackets 24, 24, the tie brace 26 and the strap 16. Interposed between each end of the tie brace 26 and the associated bracket 24 is a messenger cable clamp 30 which grips the messenger cable 12, the latter serving to relieve the strain on the cable 4.

The end portions of the tie brace 26 are enlarged to provide legs 32, 32 which, together with the remainder main body of the tie brace 26, form an obtuse angle as shown in FIG. 2. Each of the legs 32, 32 has a series of holes 34 which are longitudinally spaced apart relative to the longitudinal dimension of the tie brace 26. The holes 34 are intended to receive selectively clamps 36, 36 which are of metallic construction and which grip the conductive shield 38 of the cable 12. In this regard it should be noted that a conventional telecommunications cable includes an outer dielectric sheath 40 that surrounds an inner conductive metal grounding shield such as shown at 38.

Each cable clamp 36 is of a conventional construction and may be of the type described in U.S. Pat. No. 3,778,749. Briefly, the clamp comprises inner and outer gripping jaws or plates 42, 44 which are on opposite sides of the metallic cable shield 38 and with the inner plate at least making contact with the cable shield 38. The clamp 36 also includes a threaded stud 46 which is in permanent connection with the inner metallic plate 42 and which projects through the outer metallic plate 44 and through one of the selected holes 34 as may be convenient. Nuts 48 on opposite sides of the tie brace legs 32, 32 serve to retain the stud 46 in firm assembled relationship with the tie brace 26. Thus, each of the clamps 36, 36 is directly connected to the tie brace so as to form a continuous electrical connection over the interrupted portion of the cable shield between the opposite ends of the splice case 2.

The invention is claimed as follows:

1. A ready access closure and communications cable, wherein the cable has an outer dielectric sheath and an electrically conductive shield surrounded thereby and which shield is interrupted between the hereinafter recited brackets, said closure further having a strap running lengthwise of the closure, spaced apart brackets attached to the respective opposite ends of the strap and being clear of the cable, a messenger cable running lengthwise of the closure in spaced relation to said strap, a messenger cable clamp secured to each bracket for gripping the messenger cable, a grounding clamp adjacent to each bracket for removably gripping said shield, a unitary electrically conductive tie brace extending between said brackets and joined to each such that a frame structure is provided that includes with said tie brace, said brackets and said strap, and fastener means for removably connecting each said grounding clamp directly to said tie brace to form a continuous electrical connection over the interrupted portion of the shield while keeping the cable free of clamping engagement with said frame structure but retaining the cable-supporting function of the messenger cable.

2. A structure according to claim 1 in which said tie brace has opposite end portions each with a series of holes therein for selectively receiving said fastener means.

3. A structure according to claim 2 in which said end portions are enlarged and have legs that form an obtuse angle with the remainder of said tie brace, one of the legs being adapted to lie adjacent to the cable and containing said fastener means.

4. A structure according to any one of claims 1-3 in which each said messenger cable clamp is located between the brackets and the tie brace.

5. A structure according to any one of claims 2 or 3 in which said fastener means includes a threaded stud and a nut.

* * * * *